United States Patent Office 3,794,701
Patented Feb. 26, 1974

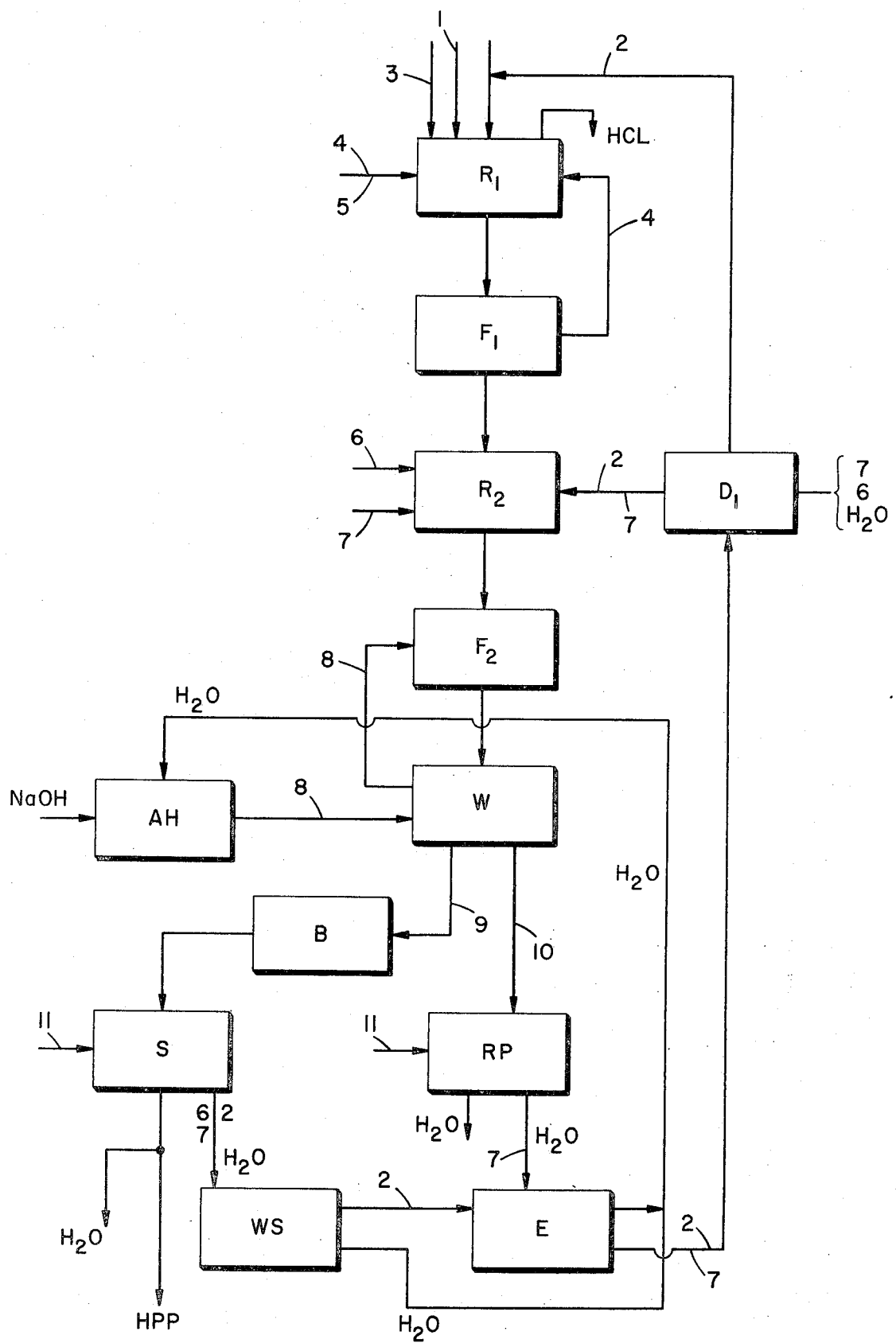

3,794,701
PROCESS FOR THE PREPARATION OF HEXA-ALKOXYPHOSPHAZENE
Joannes Dominicus Bik, De Steeg, Netherlands, assignor to Akzo N.V., Arnhem, Netherlands
Filed May 15, 1972, Ser. No. 253,608
Claims priority, application Netherlands, May 17, 1971, 6,772/71
Int. Cl. C07f 9/22, 9/24, 9/26
U.S. Cl. 260—973
5 Claims

ABSTRACT OF THE DISCLOSURE

An improved process for the preparation of hexa-alkoxyphosphazene is disclosed. Hexachlorophosphazene is initially formed by reacting phosphorus chloride and ammonium chloride in the presence of chlorobenzene as a solvent. The resulting solid components are isolated, ordinarily by filtration. The remaining mixture is then reacted with a monovalent alkanol (propanol is preferred) and pyridine. The pyridine hydrochloride which is formed is treated with an alkali hydroxide to give a pyridine-water fraction employed in pyridine regeneration. This fraction is also isolated. Hexa-alkoxyphosphazene is recovered from the remaining organic fraction while the resulting solvent-rich liquid phase is distilled to allow pyridine recovery.

---

The present invention relates to an improved process for the preparation of hexa-alkoxyphosphazene generally comprising the steps of preparing hexachlorophosphazene from phosphorus chloride and ammonium chloride in the presence of a solvent, reacting the resulting mixture with a monovalent alkanol and pyridine after isolation of the solid components, treating the resulting pyridine hydrochloride with an alkali hydroxide in order to obtain a pyridine-water fraction from which the pyridine is regenerated, and separating the organic fraction which remains after isolation of the aqueous pyridine fraction into hexa-alkoxyphosphazene and a solvent-rich liquid phase.

The major operational parameters of the process are known.

To enable this type of process to be carried out on an industrial scale it is not merely sufficient for the end-product to be of good quality and to be present in an economically satisfactory yield. It is also necessary that attention be paid to the choice of and the regeneration of all the auxiliary substances used in the process.

In preparing hexa-alkoxyphosphazene, the most important auxiliary substances are pyridine, employed as an acid-binding agent, as well as the solvents used as the reaction medium and as a pyridine purifying agent.

A disadvantage of the known process is that different types of solvent are used in the preparation of the phosphazene and in the purification of the pyridine. This makes it necessary to employ separate regeneration processes.

It has now been recognized that these steps can be omitted in the preparation of hexa-alkoxyphosphazene, provided that the right solvent is chosen for the preparation of the hexachlorophosphazene.

The present invention is characterized in that the reaction medium used in the preparation of hexachlorophosphazene is chlorobenzene and that the pyridine is isolated from the aqueous fraction by extraction with the solvent-rich liquid phase remaining after separation of the hexa-alkoxyphosphazene and subsequent distillation of the resulting extract.

As compared to other types of solvent previously used in the preparation of hexachlorophosphazene, chlorobenzene offers the advantage not only of having a favorable influence on the preparation, but also of being capable of undergoing subsequent reaction and regeneration processes without being subject to decomposition. This cannot be said of tetrachloroethane. Moreover, it may suitably be used for the practically entire extraction of pyridine from water.

The solvent-rich liquid phase extracted from the reaction mixture containing hexa-alkoxyphosphazene by steam distillation or some other distillation process usually contains small amounts of pyridine and alkanol in addition to chlorobenzene. If extracted by steam distillation, the phase will also contain water. It is removed, as far as necessary, in a water separator. The mixture is supplied to an extractor into which is also fed the aqueous pyridine fraction formed after the pyridine hydrochloride has successively been treated with alkali hydroxide and reconcentrated. A pyridine-rich solvent phase forms in the extraction.

In the subsequent distillation of the pyridine-rich solvent virtually pure pyridine can be distilled off.

In that case, just as in the prior art process, the pyridine must be accurately checked for its water content before being re-used in the preparation of hexa-alkoxyphosphazene. Moreover, a long column must be available for isolating the pyridine in a relatively pure state.

To meet this drawback the present invention provides a process which is characterized in that the distillation of the resulting extract (the pyridine-chlorobenzene-alkanol-water mixture) is so carried out that there is formed (1) a fraction consisting of almost pure chlorobenzene, (2) a fraction containing pyridine and chlorobenzene, which fraction contains at least 90% by weight of the pyridine which was added at the beginning of the process, and (3) a fraction which contains water, alkanol, and pyridine.

The fraction containing almost pure chlorobenzene can immediately be reused as the reaction medium in the preparation of hexachlorophosphazene, and the fraction containing pyridine and chlorobenzene may be added during the alkoxylation treatment, with the pyridine being used as acid-binding agent in the preparation of hexa-alkoxyphosphazene.

The weight percent of pyridine calculated on the chlorobenzene in the distillate may vary between wide limits, for instance from 10 to 90%.

A low percentage of pyridine implies that the ratio of pyridine to chlorobenzene is low.

This may be due to the use of a relatively very large amount of chlorobenzene. This has the disadvantage of leading to high regeneration cost.

If, on the other hand, the pyridine-to-chlorobenzene ratio is very high, there is the risk that not only pyridine but also water will come over with the pyridine-chlorobenzene mixture in the distillation treatment.

In practice the distillation is preferably carried out such that the fraction containing pyridine and chlorobenzene has a weight ratio of pyridine to chlorobenzene of 1:1. Under properly chosen process conditions the fraction consisting of water, pyridine and alkanol will generally be small. It may be discharged, or stored, and further processed after a reasonably large amount thereof has been collected.

Practically all monovalent alkanols that react with hexachlorophosphazene to form an alkoxyphosphazene are suitable for carrying out the process of the present invention.

In practice very favorable results are achieved with the use of propanol.

In order to prevent the liberation of large amounts of alkanol in the distillation, which would have to be processed in a later stage, it is preferred to employ a process wherein alkanol is used in an amount ranging from a stoichiometric proportion to a slight excess.

This also makes it possible to keep the pyridine-alkanol-water fraction as small as possible.

For the same reason it is preferred to employ an excess of pyridine.

Moreover, in order to prevent the apparatus from being attacked by acid, the pyridine is preferably used in an excess of 10%, calculated on the stoichiometric amount. In this way any acid formed is immediately neutralized, which permits the use of a simple steel apparatus.

Any one of the afore-described processes may be carried out in a continuous manner or batchwise.

A continuous process generally involves a large capital outlay; and a discontinuous process has the disadvantage that some of the steps such as the regeneration by distillation of pyridine and solvent, require a long starting time. They also are cumbersome. To overcome these disadvantages the present invention provides a process which is so carried out that both the hexa-alkoxyphosphazene processing and the pyridine regeneration are performed in a continuous manner. In this way there is provided a process for the preparation of hexa-alkoxyphosphazene involving only a small capital outlay and a minor loss of auxiliary agents, as a result of which the product can be produced at a relatively low cost price.

The invention will be further described in the following example with reference to the accompanying block diagram.

EXAMPLE

A mixture referred to by R1 in the block diagram contained a mixture of 1770 kg. of phosphorus trichloride 1 and 5600 kg. of chlorobenzene 2 through which 918 kg. of chlorine gas 3 was passed for 45 minutes, with such cooling applied such that the temperature did not rise above 90° C.

Next, 760 kg. of finely divided ammonium chloride 4 and 84 kg. of quinoline 5 were added, with the reaction temperature being kept between 120 and 130° C. for about 4 hours. After cooling, the excess ammonium chloride 4 (129.5 kg.) was filtered off (filter F1) and passed back into R1. The filtrate was fed into a second reactor (R2) and was found to contain:

| | Kg. |
|---|---|
| Chlorobenzene 2 | 5547.2 |
| Phosphorus pentachloride | 266 |
| Hexachlorophosphazene | 1344 |
| Quinoline 5 (as salt of hydrochloric acid) | 84 |

To the reaction mixture were added 1575 kg. of propanol 6 and 4480 kg. of a mixture containing approximately equal amounts by weight of pyridine 7 and chlorobenzene 2 from the regeneration stage (distillation column D1). In certain cases it will be necessary to supply an additional amount of pyridine 7.

The resulting mixture was subjected to reaction for approximately 24 hours at 15 to 18° C., followed by passing it over a filter (F2), the amount of solid matter retained by the screen totalling 2950 kg. and the filtrate being collected in a washing vessel (W). Thereupon the reaction products formed during the discontinuous preparation of hexapropoxyphosphazene (HPP) were processed in a continuous fashion lasting 7 hours.

The filtrate consisting of approximately 1900 kg. of hexapropoxyphosphazene (HPP), 7785.5 kg. of chlorobenzene 2, 182 kg. of propanol 6, 84 kg. of quinoline 5 and 406 kg. of pyridine 7 was washed with weakly diluted alkali hydroxide 8, which had been prepared by dissolving, in a vessel (AH), 1862 kg. of 50% by weight of NaOH in 8400 kg. of water ($H_2O$) from the steam distillation (S) of hexapropoxyphosphazene (HPP)-containing chlorobenzene 2 (1000 kg./hour from the water separator (WS) and 200 kg./hour from the extractor (E)).

After this washing process the water-immiscible organic fraction 9 was fed to a buffer reservoir (B) and subsequently subjected to continuous steam distillation (S) for 7 hours.

From the washing vessel (W) the aqueous fraction 10 was fed to a reconcentration apparatus (RP).

Next, alkali hydroxide 8 from the vessel (AH) was fed to the washing vessel (W), from where it was repeatedly passed over F2, which caused the filter cake to go into solution.

Also the water layer 10 was fed to the reconcentration pyridine (RP) where it was worked up in a continuous process lasting 7 hours.

The small amount of organic fraction 9 was added to the liquid in the buffer reservoir (B).

Per hour a mixture of the following composition was fed from the buffer reservoir (B) to the steam distillation (S):

| | Kg. |
|---|---|
| Hexapropoxyphosphazene (HPP) (approx.) | 269.0 |
| Chlorobenzene 2 | 1112.5 |
| Propanol 6 | 26.0 |
| Pyridine 7 | 58.0 |
| Quinoline 5 | 84.0 |
| Total (approx.) | 1549.5 |

To the pyridine reconcentration (RP) were fed:

| | Kg. |
|---|---|
| Pyridine 7 (approx.) | 262 |
| $H_2O$ | 1393 |
| NaCl | 195 |
| Reaction products formed from $PCl_5$ (calculated as $PCl_5$) | 38 |
| Total (approx.) | 1888 |

The reaction products formed from $PCl_5$ were found to be present in the organic fraction 9 as well as in the water layer 10.

Per hour 1100 kg. of steam 11 was added to the steam distillation (S).

The yield of hexapropoxyphosphazene (HPP) amounted to approximately 269 kg./hour.

The 1000 kg. of water per hour which came over with the 1112.5 kg. of chlorobenzene 2 was successively separated in a water separator (WS), mixed with 200 kg. of water from the pyridine extraction (E) and used for the preparation of the diluted alkali hydroxide 8 in the appropriate vessel (AH).

The chlorobenzene 2 which still contained pyridine 7 and propanol 6 was fed to an extractor of the pyridine-water layer after the latter had been concentrated—reconcentration pyridine (RP)—the yield per hour being approximately 262 kg. of pyridine 7 and 200 kg. of water.

This resulted in an hourly yield of a pyridine chlorobenzene mixture consisting of 320 kg. of pyridine 7 and 1112.5 kg. of chlorobenzene 2.

The mixture was fed to a distillation column (D1) in which it was separated into a fraction almost entirely consisting of pure chlorobenzene 2 (800 kg./hour) and a mixture consisting of virtually equal amounts by weight of pyridine 7 and chlorobenzene 2 (630 kg./hour).

At the top of the column there was collected a small amount of a mixture consisting of water, pyridine 7, and propanol 6 (30 kg./hour).

The chlorobenzene 2 was fed back into R1 and the pyridine/chlorobenzene mixture into R2.

What is claimed is:

1. A process for the preparation of hexa-alkoxyphosphazene comprising
    reacting phosphorus chloride and ammonium chloride in the presence of chlorozenzene to form hexachlorophosphazene,
    isolating the resulting solid components,
    reacting the remaining mixture with a monovalent alkanol and pyridine, treating the resulting pyridine hydrochloride with an alkali hydroxide to form a pyridine-water fraction to permit the regeneration of pyridine, isolating the aqueous pyridine fraction, separating the remaining organic fraction into hexa-alkoxyphosphazene and a solvent-rich liquid phase, recovering said hexa-alkoxyphosphazene, distilling the solvent-rich liquid phase containing pyridine, chlorobenzene, alkanol and water and isolating pyridine from the aqueous fraction by extraction with the distilled solvent-rich liquid phase.

2. The process of claim 1 wherein distillation of the solvent-rich liquid phase causes separation into a fraction of almost pure chlorobenzene, a fraction containing pyridine and chlorobenzene with at least 90% by weight of pyridine which was added at the beginning of the process, and a fraction containing water, alkanol and pyridine.

3. The process of claim 2 wherein the fraction containing pyridine and chlorobenzene possesses a weight ratio of pyridine to chlorobenzene of 1:1.

4. The process of claim 1 wherein the manufacture of hexa-alkoxyphosphazene and the regeneration of pyridine are both carried out in a continuous manner.

5. The process of claim 1 wherein said alkanol is propanol.

References Cited
UNITED STATES PATENTS

| | | | |
|---|---|---|---|
| 3,676,311 | 7/1972 | Frank et al. | 260—927 NX |
| 3,524,907 | 8/1970 | Stockel et al. | 260—927 NX |
| 3,530,204 | 9/1970 | Harrington et al. | 260—927 NX |

LEWIS GOTTS, Primary Examiner

R. L. RAYMOUND, Assistant Examiner

U.S. Cl. X.R.

260—927 N, 990